United States Patent [19]

Menon et al.

[11] Patent Number: 5,409,646
[45] Date of Patent: Apr. 25, 1995

[54] METHOD FOR COMPOUNDING A POLYMERIZED ALPHA-OLEFIN RESIN

[75] Inventors: Raghunath G. Menon, Hackettstown; Robert J. N. Bernier, Flemington, both of N.J.; Albert L. Legg, Upper Black Eddy, Pa.

[73] Assignee: Union Carbide Chemicals & Plastics Technology Corporation, Danbury, Conn.

[21] Appl. No.: 128,888

[22] Filed: Sep. 29, 1993

[51] Int. Cl.6 .............................................. B29C 47/76
[52] U.S. Cl. ...................................... 264/28; 264/102; 264/331.17; 264/211.23; 264/349; 425/203; 425/204
[58] Field of Search ................ 264/101, 28, 102, 349, 264/211.23, 211.24, 331.17; 425/203, 204

[56] References Cited

U.S. PATENT DOCUMENTS

| | | | |
|---|---|---|---|
| 3,260,774 | 7/1966 | Harlow | 264/28 |
| 3,767,754 | 10/1973 | Manning et al. | 264/349 |
| 3,851,863 | 12/1974 | Wallis | 264/349 |
| 4,041,115 | 8/1977 | Jenkins et al. | 264/28 |
| 4,053,143 | 10/1977 | Hosokawa et al | 366/89 |
| 4,065,532 | 12/1977 | Wild et al. | 264/349 |
| 4,100,244 | 7/1978 | Nonaka | 264/211 |
| 4,155,655 | 5/1979 | Chiselko et al. | 366/83 |
| 4,178,337 | 12/1979 | Hall et al. | 264/28 |
| 4,594,213 | 6/1986 | Ealer | 264/564 |
| 4,814,135 | 3/1989 | Heitz | 264/564 |

*Primary Examiner*—Jeffery R. Thurlow
*Attorney, Agent, or Firm*—B. L. Deppenbrock

[57] ABSTRACT

A method for compounding at least one polymerized alpha-olefin resin in an extruder including a screw having a feeding section, a melting section, and a venting section, which method includes: (1) introducing the resin and a heat transfer medium into the feeding section such that the resin is maintained at a temperature below its melting point; (2) transporting the resin and heat transfer medium to the melting section such that the resin is at a temperature which is at or just above its melting point by sublimation or vaporization of the heat transfer medium and kneading the resin at a temperature which is at or just above its melting point; (3) passing a resin melt of step (2) through a melt seal into a venting section wherein the heat transfer medium is released from the extruder; and (4) pumping the resin melt out of the extruder.

10 Claims, No Drawings

METHOD FOR COMPOUNDING A POLYMERIZED ALPHA-OLEFIN RESIN

FIELD OF THE INVENTION

The present invention relates to a method for compounding a polymerized alpha-olefin resin in an extruder. More particularly, the present invention relates to a method for compounding at least one polymerized alpha-olefin resin in the presence of a heat transfer medium, such as dry ice, liquid carbon dioxide, or liquid nitrogen, to improve homogeneity of the polymer product. The polymer product can be used to make plastic films having reduced gel formation.

BACKGROUND OF THE INVENTION

Plastic films are characterized by such properties as good tensile strength, high ultimate elongation, good impact strength and puncture resistance. In addition to these characteristics the films need to exhibit esthetic qualities such as a smooth surface appearance. These properties together with toughness are relatively easily obtained when the polymer resin used to produced the films is polyethylene. However, as the molecular weight of the polyethylene increases, the processability of the polyethylene usually becomes extremely difficult, often requiring excessive energy inputs in a film-forming extruder. To improve processability, particularly extrudability in a film-forming extruder, a blend of polymers, such as a polyethylene and an alpha olefin, is often employed. One of the main reasons for blending is to obtain a resin having a set of desired properties such as strength in the fabricated article or film while allowing easy processability in the fabricating equipment. Blends of a low molecular weight polymer and a high molecular weight polymer, such as blend of a low molecular weight polyethene and a high molecular weight polyethene each having a narrow molecular weight distribution (i.e., a bimodal blend) are a particularly attractive route to achieving easy processability while increasing the strength of the film or fabricated article.

Three major strategies have been proposed for the production of polymer resins used to fabricate films. One is the direct production of a resin or a blend of resins having the above-mentioned characteristics of toughness and easy processability, via one or more catalysts in a single fluidized bed reactor. A second makes use of multi-stage reactors operating independently or in series, primarily to produce resin blends. A third strategy is a post-reactor or post-multiple reactor treatment, such as melt blending a resin or a blend of resins in an extruder.

In general, polymer resins manufactured employing the above-mentioned strategies require a certain degree of homogenization prior to being used to make a plastic film. This homogenization is typically carried out in a melt phase operation which involves mechanical mixing. The melt mixing is carried out in either batch mixers or continuous mixers such as single or twin screw extruders. The objective of the mixing step is to disperse and distribute one component of the blend into the other. Usually, the major component forms a matrix while the minor component forms a dispersed phase, although phase inversions are known to occur depending on the viscosity and elasticity ratios of the two components. The most useful commercial blends consist of a high molecular weight matrix with a low molecular weight component being in the dispersed phase. The high molecular weight matrix to a large degree determines the properties of the fabricated article in the solid state such as film strength, while the dispersed low molecular weight component aids in the processing of the blend.

In post treatments, such as in melt blending, the polymer resin is not readily mixed such that it becomes homogeneous. In plastic films, the inhomogeneity shows up as gels (also known as "gelling" or "gel-streaking"). Gel-streaking in films is an optical degradation phenomena evidenced by surface roughness in the form of the inclusion, either singularly or in rows, of v-shaped imprints (also referred to as "arrowheads" or "chevrons"), streaks of soft gels; or, in extreme cases, the film texture is completely permeated by soft gels. Such visual degradation phenomena not only detract from film optical and mechanical strength properties, but also can cause severe problems with respect to maintaining bubble geometry during a film forming process. Therefore, there is an on-going need for a compounding process to decrease the size and the number of gels in a polymer resin or resin blend used to fabricate film.

In commercial practice, post treatment blending processes usually involve the use of intensive mixing and prolonged mixing times. Additionally, to prevent or reduce gels, post treatment extrusion can require that a polymer be processed or passed through an extruder more than once. Both intensive mixing at prolonged times and multi-pass extrusion typically degrades the resin. Accordingly, there exists an on-going need for a post treatment extrusion process for polymer and polymer blends, especially polyethylene and polyethylene blends, which results in minimal or reduced gel formation in a finished plastic film.

SUMMARY OF THE INVENTION

The present invention provides a method for compounding at least one polymerized alpha-olefin resin in an extruder including a screw having a feeding section, a melting section, a venting section, and, optionally, a pumping section, which method comprises:

(1) introducing the resin and a heat transfer medium into the feeding section such that the resin is maintained at a temperature below its melting point;

(2) transporting the resin and heat transfer medium to the melting section such that the resin is at a temperature which is at or just above its melting point and kneading the resin at a temperature which is at or just above its melting point;

(3) passing a resin melt of step (2) through a melt seal into a venting section wherein the heat transfer medium is released from the extruder; and (4) pumping the resin melt out of the extruder.

DETAILED DESCRIPTION OF THE INVENTION

Polymerized Alpha-olefin Resin

Polymerized alpha-olefin resins which can be employed in the method of the present invention can include homopolymers such as high density polyethylene and low density polyethylene, and copolymers of polyethylene and at least one alpha-olefin. Resins which can be used in the method of the present invention are homopolymers of ethylene or copolymers of a major mole percent ($>90\%$) of ethylene, and a minor mole percent ($>10\%$) of one or more $C_3$ to $C_8$ alpha-olefins. The $C_3$ to $C_8$ alpha-olefins should not contain any branching on any of their carbon atoms which is closer than the fourth carbon atom. The preferred $C_3$ to $C_8$ alpha-olefins are propylene, butene-1, pentene-1, hexene-1, and octene-1. Particularly preferred resins which can be employed in the method of the present invention are bimodal blends of the above-mentioned alpha-olefin resins.

The ethylene polymers used as the resin herein have a melt flow ratio (MFR) of $>18$ to $<32$, and preferably of $>22$ to $<32$. The melt flow ratio value is another means of indicating the breadth of the molecular weight distribution of a polymer.

The homopolymers have a density of about $>0.958$ g/cc to $<0.972$ g/cc and preferably of about $>0.961$ g/cc to $<0.968$ g/cc.

The copolymers have a density of about $>0.91$ g/cc to $<0.96$ g/cc, preferably $>0.917$ g/cc to $<0.955$ g/cc, and most preferably, of about 0.917 g/cc to $<0.950$ g/cc. The density of the copolymer, at a given melt index level for the copolymer, is primarily regulated by the amount of the $C_3$ to $C_8$ comonomer which has been copolymerized with the ethylene. In the absence of the comonomer, the ethylene would homopolymerize to provide homopolymers having a density of about 0.96 g/cc. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions. Thus, to achieve the same results, in the copolymers, in terms of a given density, at a given melt index level, larger molar amounts of the different comonomers would be needed in the order of $C_3>C_4>C_5>C_6>C_7>C_8$.

The melt index of a homopolymer or copolymer is a reflection of its molecular weight. Polymers having a relatively high molecular weight, have a relatively low melt index. Ultra-high molecular weight ethylene polymers have a high load melt index (HLMI, ASTM I21) of about 0.0 and very high molecular weight ethylene polymers have a high load melt index (HLMI) of about 0.0 to about 1.0. The polymers useful in the present invention have a standard or normal load melt index (ASTM I2) of $>0.0$ to about 50, and preferably of about 0.01 to 35, and a high load melt index (HLMI) of about 2 to about 950. The melt index of the polymers which are used in the method of the present invention is a function of a combination of the polymerization temperature, the density of the copolymer, and the hydrogen/monomer ratio in the reaction system in which the polymers were made.

The ethylene polymers employed as the resin in the present invention are made in a gas phase fluidized bed reactor or by slurry processing, and have a residual catalyst content, in terms of parts per million of titanium metal, of the order of $<20$ parts per million (ppm), at a productivity level of $>50,000$; of the order of $<10$ ppm at a productivity level of $>100,000$; and of the order of $<3$ ppm at a productivity level of $>300,000$. When the polymers are made with halogen containing catalysts wherein the halogen is chlorine, the polymers have a Cl residue content of $<140$ ppm at a productivity of 50,000; a Cl content of $<70$ ppm at a productivity of $>100,000$; and a Cl content $<21$ ppm at a productivity of $>300,000$. The ethylene polymers are readily produced at productivities of up to about 300,000.

The polymers processed as the resin in the present invention are granular materials which have an average particle size of the order of about 0.005 to about 0.06 inches, and preferably of about 0.02 to about 0.04 inches, in diameter. The polymers of the present invention have a settled bulk density of about 15 to 32 pounds per cubic foot.

The homopolymers and copolymers resin products compounded by the method of the present invention are useful for making film. For film making purposes the preferred copolymers of the present invention are those having a density of about $>0.917$ g/cc to $<0.950$ g/cc; High Load Melt Index (HLMI; ASTM I21) of $>1$ to $<10$, and preferably of about $>6$ to $<10$. The films have a thickness of $>0$ to $<10$ mils, and preferably of $>0$ to $<5$ mils. These film-forming polymers may be used in the form of powders, pellets, granules, or any other form that can be fed to a film-forming extruder.

Heat Transfer Medium

In the method of the present invention a heat transfer medium is added to the solid polymerized alpha-olefin resin feed. Suitable heat transfer mediums for use for the present invention can include dry ice, liquid nitrogen, and liquid carbon dioxide. Preferred heat transfer mediums are dry ice and liquid nitrogen. Most preferably, the heat transfer medium is dry ice. The amount of the heat transfer medium ranges from about 5% to 30%; preferably from about 10% to 20% by weight based upon the total feed rate of the polymerized alpha-olefin resin.

When dry ice is employed as the heat transfer medium, it is preferably pulverized and enters the feed section of the extruder via a feed throat. In the present invention substantially all of the dry ice is in the solid state until it enters the melting section where it sublimes. Dry ice is typically at a temperature of about $-78.5°$ C. In the melting section the dry ice sublimes as the resin begins to melt which causes the resin melt temperature to drop resulting in a homogeneous dispersion of the low molecular weight component in the high molecular weight matrix.

When liquid nitrogen or liquid carbon dioxide is employed as the heat transfer medium, they behave somewhat differently from the dry ice. In the present invention, the liquid nitrogen or liquid carbon dioxide is introduced into the feeding section of the extruder as a liquid. The feed rate for the liquid nitrogen or liquid carbon dioxide ranges from about 20% to 50% of the total resin feed rate. That is, for every 100 pounds/hour of resin up to about 50 pounds of liquid nitrogen or carbon dioxide would be required. In the case of liquid nitrogen or liquid carbon dioxide the liquid vaporizes as soon as it is injected in the feeding section thereby producing a very cold granular resin. Typically, liquid nitrogen vaporizes at $-196°$ C., and liquid carbon dioxide vaporizes at $-60°$ C. Due to the vaporization of the heat transfer medium in the feeding section, the granular resin becomes much colder when liquid nitrogen or carbon dioxide is employed rather than dry ice. When liquid nitrogen or carbon dioxide is employed, the cold resin surrounding a melt pool heats up by soaking up the heat from the melt pool and as a result does not achieve the same amount of decrease in melt temperature as with dry ice. Accordingly, the use of liquid nitrogen or liquid carbon dioxide generally results in a compounded resin which is less homogeneous than one obtained using dry ice.

Resin Additives

Optionally, one or more resin additives which are conventional in the art can be incorporated in the present invention. Merely as illustrative, the following can be employed: zinc stearate; calcium stearate; octadecyl 3,5-di-tert-butyl-4-hydroxyhydrocinnamate (available as Irganox 1076 from Ciba-Geigy Corporation); and tris(2,4-di-tert-butylphenyl) di-tert-butylphenyl) phosphate (available as Irgafos 168 from Ciba-Geigy Corporation). When employed in the present invention the additives can be added separately or as a mixture into the feeding section of the extruder. In a preferred embodiment, the additives are added as an additive masterbatch containing the additives and resin. In the additive masterbatch amount of additives to resin ranges from about 2:8 to 0.1:9.9, preferably the range is about 1:9. In general the concentration of each additive in the compounded resin product ranges from about 400 ppm to 1000 ppm.

Extruder

It is understood that the extruder herein is utilized in its normal environment, i.e., in cooperative association with conventional frame means, a horizontally extending barrel, feed and hopper means, blender and drive or gear means all of which constitute well known apparatus commercially available to the art. Merely as illustrative, the extruder screw can be mounted in apparatus disclosed in U.S. Pat. Nos. 4,155,655 and 4,053,143.

Any extruder conventionally employed in the polymer extrusion art can be employed in the method of the present invention. Such extruders can have a single screw design or a twin screw design. Preferably, the extruder employed in the present invention is a twin screw extruder. The twin screw extruder is commercially available from a variety of sources such as Werner & Pfleiderer Corp., Berstoff Corp., and Welding Engineers. The twin extruder employed in the examples herein is a model ZSK-57 obtained from Werner & Pfleiderer Corp.

The extruder employed in the present invention includes a screw having a feeding section, a melting section, a venting section, and, optionally, a pumping section. The screw has a helical land on its surface which cooperates with the cylindrical internal surface of the barrel to define an elongated helical channel. A melt seal having a reverse pitch screw element separates the melting section from the venting section. The reverse pitch screw element ensures that the melting section is essentially full of resin and the venting section is only partially full of resin. The venting section is only partially filled with resin in order to prevent the resin from discharging through the vent orifice.

The feeding section of the extruder is comprised of a plurality of constant pitch screw elements. By constant pitch is meant that the distance between adjacent flights is the same to prevent compaction of the resin and premature melting of the resin and sublimation or vaporization of the heat transfer medium. The length of feeding section typically is about 2 to 12 times the diameter of the screw, preferably the length of the feeding section is about 8 to 10 times the diameter of the screw.

The melting section of the extruder is comprised of a plurality of kneading blocks. Preferably, the total length of the kneading blocks is 3 to 10 times in length the diameter of the screw. The melting section is comprised of kneading blocks which have discrete paddles (about 2 to 6) of narrow width (about 2 to 10 millimeters), staggered at discrete angles ranging from about 15 to 90 degrees.

The venting section contains a vent orifice and is comprised of screw elements having a pitch equal to or greater than the pitch of the screw elements of the feeding section. Preferably a pumping section is employed in the extruder. When a pumping section is employed, preferably it has screw elements of decreasing pitch to generate pressure to move the worked resin out of the extruder. In the pumping section the screw elements generally have a pitch which is about $\frac{1}{2}$ the pitch of the screw elements in the venting section.

The extrusion screw used in the present invention may have a length to diameter ratio of 15:1 to 30:1 and preferably 17:1 to 25:1. In the feeding section, the length of the lead, i.e., the distance from one point on the flight to the corresponding point on adjacent flight can be 0.8 to 1.5 times the nominal screw outside diameter, preferably 1.05 to 1.4 times the nominal screw outside diameter. In the venting section the length of the lead can be 1 to 2 times the nominal screw outside diameter, preferably 1.5 to 1.8 times the nominal screw outside diameter. When a pumping section is employed, the length of the lead can be 1 to 0.2 times the nominal screw outside diameter, preferably 0.8 to 0.5 times the nominal screw outside diameter.

Mode of Operation

In a typical mode of operation, a twin screw extruder is heated to a temperature to about 150° C. to 170° C. at which point heating is discontinued. Under adiabatic conditions in the extruder, the alpha-olefin resin to be extruded is introduced either in granular or pellet form along with a heat transfer medium, and, optionally, one or more additives into the inlet opening of the feeding section of the extruder screw. The resin, heat transfer medium, and, optionally the additives proceed along the length of the feeding section with minimal compaction. Minimal compaction is accomplished by having the screw elements in this section at constant pitch. In the feeding section the resin is at a temperature below its melting point. In general, the temperature in the feeding section ranges from about 70° C. to 100° C.

The resin, heat transfer medium, and, optionally, the additives are transported to the melting section of the extruder screw. In the melting section, the resin is maintained at a temperature which is at or just above its melting point by the sublimation (if using dry ice) or vaporization (if using liquid nitrogen or liquid carbon dioxide) while kneading the resin to form a resin melt. The melting section of the extruder is the section in which most (80% or more) of the melting of the resin occurs. As the resin is contacted by the kneading blocks in the melting section, interparticle friction and heat transferred from the barrel of the extruder cause the resin to melt or become molten and the heat transfer medium to change phase. When the heat transfer medium changes phase, the heat from the resin is removed, thereby decreasing the resin melt temperature substantially uniformly throughout the resin melt (i.e., molten resin). With the decrease in the resin melt temperature, the viscosity of the resin melt increases allowing the kneading blocks in the melting section to more readily work or mix the resin melt, thereby producing a resin melt having the consistency of dough which results in a substantial improvement in the compositional homogeneity of the molten polymer. By homogeneity is meant the uniform dispersion of the low molecular weight component in the high molecular weight matrix. Films fabricated from such homogeneous polymer blends exhibit significant reduction in gels. In general, the temperature in the melting section ranges from about 120° C. to 140° C.

The resin melt and gaseous heat transfer medium is passed through a melt seal inserted into the extruder between the melting and venting sections. The melt seal is established by means of a reverse pitch screw element or a reverse staggered kneading block which separates the melting section from the venting section of the extruder screw.

In the venting section the heat transfer medium is released from the extruder through a vent port or vent orifice. Preferably, the vent port is located immediately downstream from the melt seal. In general, the temperature in the venting section ranges from about 135° C. to 160° C.

Preferably, the resin melt proceeds into a pumping section of the extruder. In general, the temperature in the pumping section ranges from about 150° C. to 180° C. From the pumping section the resin melt is conveyed to downstream apparatus such as, for example, a screen pack (20 mesh screen) mounted on a breaker plate, a pelletizing apparatus, and/or a film-forming extruder. Typically, the resin melt is extruded through a pelletizing die into multiple strands in an under water pelletizing apparatus containing a rotating knife assembly that forms the resin into granules or pellets. Then the pellets are carried by a water slurry to a centrifugal dryer. There the pellets are dried and discharged into bins for additional processing such as in film extrusion.

In a preferred embodiment the resin, heat transfer medium, and optional additive package is fed to the extruder as a mixture. When the heat transfer medium is dry ice, the dry ice and optionally an additive package are each mixed with a portion of the resin as a masterbatch comprising resin and dry ice and resin and additives, respectively. Accordingly, the extruder is fed a mixture of resin, dry ice, and additive(s) via a blender disposed between the feed throat/feed hopper attached to the feeding section of the extruder and the feeders for the individual components. The blender can be any in-line mixer such as, a Littleford fluidized mixer, a continuous zig-zag mixer, a ribbon blender, or an Auger blender. Preferably, an Auger blender is used. In a most preferred embodiment make-up dry ice is fed directly into the feed throat of the extruder. Make-up dry ice is added to replace the dry ice which sublimed during the formation of the mixture and/or masterbatches.

EXPERIMENTAL

The following Examples are designed to illustrate the process of the present invention and are not intended as a limitation upon the scope thereof.

EXAMPLE 1

Compounding with Dry Ice

A twin screw extruder (Werner Pfieiderer Corp. Model ZSK-57) having 8 barrels was heated initially to 170° C., and then heating was discontinued. A mixture of (i) a polyethylene resin (having a flow index of 8 as measured by ASTM- I21; density 0.948 g/cc, having a bimodal molecular weight distribution), (ii) an additive masterbatch, and (iii) a dry ice masterbatch was fed via an Auger blender to a feed hopper and, thence, into the feeding section of the extruder. The feeding section contained constant pitch screw elements. The resin feed rate (mass flow rate) ranged from 100 to 300 pounds per hour.

The composition of the additive masterbatch and the concentration of the additives in the product compounded from the resin were as described in Table A.

TABLE A

| Component | Masterbatch Amount, % | Additive Concentration in Product, ppm |
|---|---|---|
| Polyethylene resin | 88.5 | — |
| Irgafos 168 | 1.50 | 400 |
| Inganox 1076 | 2.50 | 800 |
| Calcium Stearate | 5.00 | 1000 |
| Zinc Stearate | 2.50 | 500 |

The dry ice masterbatch was a 4:1 mixture of dry ice and resin. Make-up dry ice (up to about 10%) was added to the feed throat of the extruder to replace dry ice which sublimed during feeding. This makeup dry ice was introduced from a cylinder of liquid $CO_2$ as a mist of liquefied $CO_2$ which is formed into dry ice particles by the rapid expansion of liquid $CO_2$. In the feeding section the resin stayed at a temperature below its melting point due to the minimal compaction of the resin and the presence of the dry ice.

The mixture was transported to the melting section of the extruder where it was kneaded using 5 kneading blocks each 60 millimeters in length and whose paddles were staggered at 45° angles. The paddles were 56 millimeters in diameter. The resin was at a temperature of about 120° C. which was at or just above the melting point of the resin to obtain a resin melt. The temperature was maintained by the sublimation of the dry ice.

The resin melt was passed through a melt seal into the venting section of the extruder. In the venting section of the extruder, the gaseous $CO_2$ was released to the atmosphere. The venting section contained two screw elements 80 millimeters in length and having a pitch equal to its length. Next, the resin melt was pumped using a close-coupled gear pump through a screen pack (20 mesh) mounted on a breaker plate.

The resin melt was extruded through a pelletizing die into multiple strands in a conventional underwater pelletizing apparatus (obtained from Gala Industries Inc.) having a rotating knife assembly that severed the strands into pellets. The pellets were carried by water slurry to a centrifugal dryer where the pellets were dried and discharged. After compounding, the pellets were processed using a conventional blown film line or film-forming extruder apparatus (Alpine American Extruder) and processed to produce a plastic film.

The film was given a Film Appearance Rating (FAR) as follows. A sample film produced in accordance with present invention (Sample Nos. 1 through 5) was viewed with the naked eye to note the size and distribution of gels or other foreign particles in comparison to a comparative film sample (Sample Nos. A through E). The comparative film samples (Sample Nos. A through E) were prepared as set forth in this example, except that no dry ice was employed. The appearance of the films were thus compared and given a rating on a scale of −50 (very poor) to +50 (excellent). The results are set forth in Table 1.

TABLE 1

| Sample No. | screw speed [rpm] | Rate [pph] | Dry Ice [%] | FAR |
|---|---|---|---|---|
| A | 200 | 180 | 0 | −20 |
| B | 200 | 210 | 0 | 0 |
| C | 235 | 180 | 0 | −10 |
| D | 235 | 210 | 0 | 0 |
| E | 235 | 250 | 0 | −20 |
| 1 | 200 | 180 | 15 | 10 |
| 2 | 200 | 210 | 15 | 20 |
| 3 | 235 | 180 | 15 | 20 |
| 4 | 235 | 210 | 15 | 20 |
| 5 | 235 | 250 | 15 | 10 |

From Table 1, it can be seen that when no dry ice was used (Sample Nos. A through E), FAR values ranged from −20 to 0 for the designated feed rates and screw speeds. With the addition of dry ice (Sample Nos. 1 through 5), the FAR improved up to 30 units, evidencing a significant improvement in film appearance. Further, films produced in accordance with the method of the present invention had FAR values which were commercially acceptable while the comparative films produced without dry ice were not commercially acceptable.

EXAMPLE 2

Compounding Using Liquid Nitrogen

Example 1 is repeated, except that liquid nitrogen is used instead of dry ice. The liquid nitrogen is injected directly into the feed throat of the ZSK-57 extruder using an injection nozzle. The liquid nitrogen begins to vaporize in the feeding section as soon as it contacts the granular resin, thereby cooling the resin. The cold resin is transported to the melting section where under the action of the kneading blocks the resin begins to melt. As the resin melts it forms pockets or melt pools within the granular solid resin. As the solid resin granules surrounding the melt pools are relatively very cold due to the resins previous contact with liquid nitrogen, the melt pool also cools. In a short section over the kneading blocks all of the granular material undergoes the process of melting and cooling, resulting in all the material being at or close to the resin melting temperature over a plurality of the kneading paddles. While the resin is being kneaded close to its melting temperature, dispersion of the gels occurs.

We claim:

1. A method for compounding at least one polymerized alpha-olefin resin in an extruder including a screw having a feeding section, a melting section, a venting section, which method comprises:
   (1) introducing the resin which is a bimodal blend and a heat transfer medium into the feeding section such that the resin is maintained at a temperature below its melting point and wherein the heat transfer medium has a mass flow rate ranging from about 5% to 30% based on the mass flow rate of the resin;
   (2) transporting the resin and heat transfer medium to the melting section such that the resin is at a temperature which is at or just above its melting point and kneading the resin at a temperature which is at or just above its melting point;
   (3) passing a resin melt of step (2) through a melt seal into a venting section wherein the heat transfer medium is released from the extruder; and
   (4) pumping the resin melt out of the extruder, thereby producing a homogeneous molten polymer.

2. The method of claim 1 wherein the heat transfer medium is selected from the group consisting of dry ice, liquid carbon dioxide, and liquid nitrogen.

3. The method of claim 1 wherein the extruder has a pumping section.

4. The method of claim 2 wherein the feeding section of the extruder is comprised of a plurality of constant pitch screw elements and wherein the melting section of the extruder is comprised of a plurality of kneading blocks.

5. The method of claim 4 wherein the melt seal is comprised of a reverse pitch screw element or a reverse staggered kneading block.

6. The method of claim 5 wherein the venting section is comprised of screw elements having a pitch equal to or greater than the pitch of the screw elements of the feeding section.

7. The method of claim 6 wherein the pumping of step (4) is accomplished by the extruder having a pumping section wherein the screw elements have ½ the pitch of the elements in the venting section.

8. The method of claim 7 wherein the heat transfer medium is pulverized dry ice and it is fed as a masterbatch in a ratio of 4 parts dry ice to 1 part resin.

9. The method of claim 8 wherein along with the dry ice masterbatch, additional dry ice in the range of 1 to 10% based upon the mass flow rate of the pulverized dry ice, is added to the feeding section.

10. The method of claim 9 wherein at least one additive is introduced to the feeding section along with the resin and heat transfer medium.

* * * * *